Patented Dec. 9, 1952

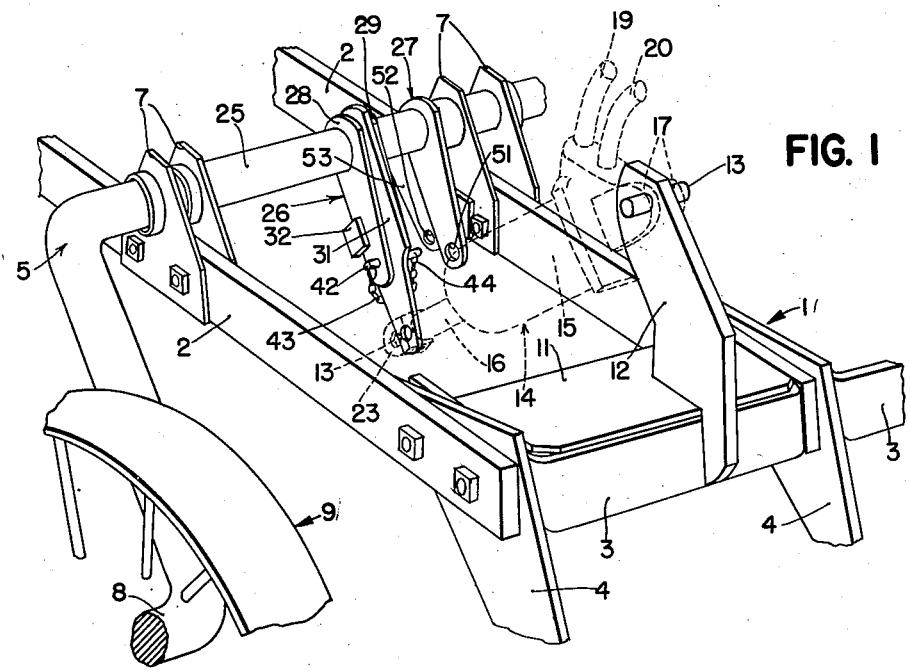
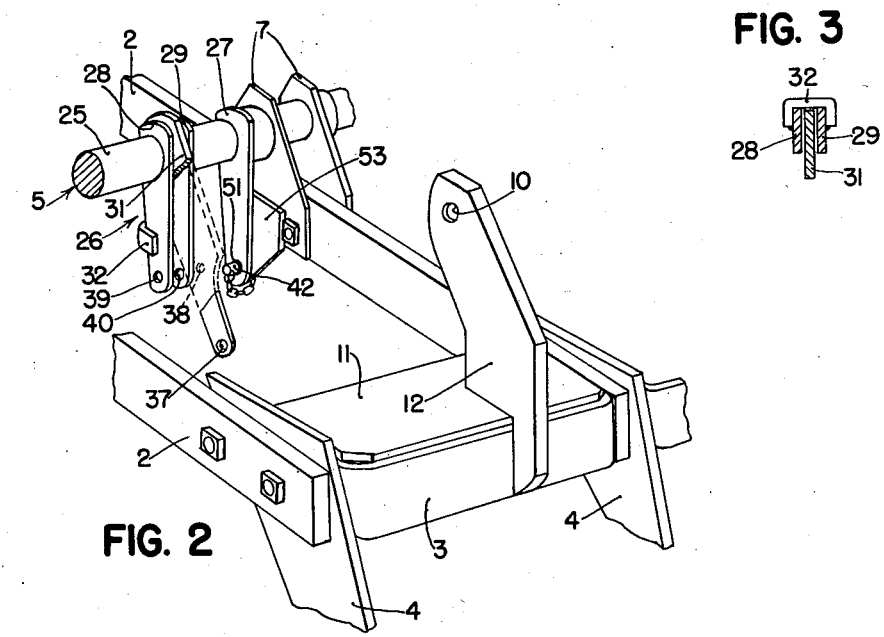

2,620,717

UNITED STATES PATENT OFFICE 2,620,717

PLOW

Walter H. Silver and John I. Cantral, Moline, Ill., assignors to Deere & Company, Moline, Ill., a corporation of Illinois Application May 14, 1945, Serial No. 593,668

8 Claims. (Cl. 97—50)

1

The present invention relates generally to agricultural implements and more particularly to implements having a part or parts to be raised and lowered by power.

The object and general nature of this invention is the provision of new and improved raising and lowering connections particularly adapted for use with a detachable power unit, such as a hydraulic piston and cylinder device connected with the tractor so as to form a normally permanent part thereof and easily and quickly removable from the implement whenever the tractor is unhitched from the implement. More specifically, it is an important feature of this invention to provide for locking the implement part in its raised position, so as to hold the part in that position even when the power operating raising unit is detached from the implement, in connection with new and improved connections making it possible to relax the operating pressures in the power unit so as to facilitate the quick detachment thereof from the implement.

These and other objects and advantages of the present invention will be apparent to those skilled in the art after a consideration of the following detailed description, taken in conjunction with the accompanying drawings in which one form of the present invention has been shown by way of illustration.

In the drawings:

Figure 1 is a perspective view of a wheel supported tractor plow having one or more crank axles swingable by power into and out of positions providing for raising the plow frame into a transport position and lowering the frame therefrom into an operating position.

Figure 2 is a fragmentary view, similar to Figure 1, showing certain of the operating connections in the positions they occupy when the plow is locked in its raised position and the power device detached therefrom.

Figure 3 is a detail section through the lifting arm.

Referring now to the drawings, the frame of the plow is indicated by the reference numeral 1 and comprises one or more plow beams 2 extending in a generally longitudinal direction and connected at their forward ends by suitable cross braces 3. Also secured to the front ends of the beams 2 are hitch brackets 4. A furrow wheel crank axle 5 is journaled for rocking movement about a transverse axis in pairs of bearing brackets 7 bolted or otherwise secured to the plow beams 2. One end of the crank axle 5 extends

2 forwardly and includes a cranked portion 8 which receives a furrow wheel 9. The crank axle 5, together with the land wheel crank axle and furrow wheel connections (not shown), normally operate together for raising and lowering the plow frame.

In order to provide for power operation of the crank axle 5 and other associated parts, we provide a transverse brace or platform 11 on which an upwardly extending cylinder-receiving bracket 12 is fixed, as by welding or the like. The upper end of the bracket 12 is apertured, as at 10, to receive one of the quick detachable pins 13 by which a hydraulic piston and cylinder unit 14 may be connected to the implement. The particular details of the hydraulic unit 14 do not per se form a part of the present invention but for purposes of illustration we have shown a double acting hydraulic unit including a cylinder section 15 and a piston section 16, the cylinder section 15 having a pair of apertured lugs 17 receiving the upper pin 13 and a pair of hose lines 19 and 20 by which fluid under pressure may be directed to and received from the cylinder 15. The outer or rear end of the piston section 16 is also provided with a pair of apertured lugs 23 receiving the lower quick detachable pin 13.

A transverse journaled portion 25 of the crank axle 5 is provided with a pair of arm means indicated generally by the reference numerals 26 and 27. The arm means 26 comprises a pair of arm sections 28 and 29 secured, as by welding, to the journal section 25 of the crank axle in laterally or axially spaced apart relation, the spacing being sufficient to receive a third arm section 31 snugly therebetween. The arm section 31 is swingably mounted on the journal portion 25 of the crank axle and is limited in its movement relative to the other arm sections 28, 29 by virtue of a clip or abutment 32 which is secured, as by welding, to the two arm sections 28 and 29. When the arm section 31 is moved rearwardly relative to the arm sections 28 and 29, the rear edge of the arm 31 comes up against the abutment 32, and if the arm 31 is then moved farther rearwardly, such motion is transmitted by the arms 28 and 29 to the crank axle 5. The arm section 31 is substantially longer than the arm sections 28 and 29 and is apertured at its lower end, as at 37, to receive the lower quick detachable pin 13. The lower end portion of the freely swingable arm section 31 is provided with a second aperture 38 which, when the rear edge of the arm section 31 comes into contact with the abutment 32, registers with or comes into alignment with a pair of openings 39 and 40 formed in the lower ends of the fixed arm sections 28 and 29. A detachable pin 42 is adapted to be inserted into these registering openings 38—40, and if desired, a chain 43 may be connected at one end to one end of the pin and with the other end of the pin through a spring hook 44, so that there will be no danger of losing the pin 42.

In the structure as so far described, and as illustrated in Figure 1, extension or retraction of the hydraulic unit 14 will act through the arm 31, the pin 42, and the arms 28 and 29 to swing the crank axle 5 in either direction by power. If, for example, it is desired to raise the plow, fluid is directed into the cylinder unit 14 to cause the same to extend, and the unit 14 is of the type which has a given extent of movement. When the unit 14 has been extended the full amount, the plow is in raised position and is held in position by virtue of the fluid locked in the cylinder by the associated control valve mechanism (not shown). However, the load when the plow is in raised position is sustained by virtue of the contact between the arm section 31 and the abutment 32, there being no load on the pin 42 in this position. Therefore, the pin 42 may, if desired, be removed by hand from the aligned openings 38—40. The only time load comes on the pin 42, when in the position shown in Figure 1, is when the cylinder 14 is actuated to raise the furrow wheel associated with the crank axle 5 entirely off the ground, as may sometimes be desirable in order to aid the penetration of the plow.

The second arm 27, mentioned above as also fixed to the journal portion 25 of the crank axle 5, is provided at its lower end with an opening 51 which is somewhat larger than the openings 38—40, and when the plow is in its raised position and the crank axle 5 swung rearwardly, as described above, the arm 27 is swung into a position carrying its opening 51 into alignment with an opening 52 that is formed in an abutment means in the form of a lock-up bracket 53 that is fixed in any suitable manner to the adjacent plow beam 2. The pin 42 may be removed from the openings 38—40 in the arms 28, 29 and 31, and may be then inserted into the openings 51 and 52, being locked therein by the spring pin 44 after the pin 42 is in place. This provides means for holding the plow in its raised position even though the cylinder unit 14 is removed from the tractor. In order, however, that the pin 42 in its new position shall take the load of holding the plow in its raised position, the cylinder unit 14 is retracted a slight amount so as to permit the arm sections 28, 29 and 31 to move slightly forwardly, generally only a few degrees, until the pressure is relieved from the arm section 31 and the abutment 32 and transferred onto the pin 42. The arm section 31 is then freed of all load and the power unit 14 may then quickly and easily be removed from the implement by removing the quick detachable pins 13, the plow remaining in its raised position by virtue of the locking pin 42 in the arm 27 and bracket 53.

The cylinder unit 14 may at any subsequent time be conveniently and easily reattached simply be reinserting the pins 13 in the bracket 12 and the now freely swingable arm 31. It is not necessary to have the lugs 17 and 23 line up exactly with any given distance between openings, because the arm 31, being freely swingable, may be swung manually into a position receiving the lower pin 13, the plow being sustained by the lock-up pin 42. After the power unit 14 has been thus reattached, fluid is delivered thereto to extend the unit its full extent, which then brings the arm section 31 back against the abutment 32, swinging the crank axle 5 and the associated arms only sufficient to relieve the pressure on the lock-up pin 42, which may then be manually removed from the arm 27 and bracket 53 and reinserted in the openings 38—40. The opening 51 in the arm 27, being slightly larger than the diameter of the pin 42 and the opening 52, allows a certain amount of tolerance so that any variation in the fully extended position of the power unit 14 will not cause the pin 42 to bind in the openings 51 and 52 when the power unit 14 is reattached and extended to take the load off of the pin 42.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement having frame means and a crank axle swingably connected therewith, a pair of arm members fixed to said crank axle and having a stop member connecting said arm members, an actuating arm pivotally connected with said crank axle and disposed between said arm members and adapted, when swung in one direction, to engage said stop member whereby continued movement in that direction of said actuating arm serves to swing said arm members and said crank axle, said arm members and said actuating arm having openings that are adapted to register with one another when said actuating arm is in engagement with its stop member, a pin adapted to be inserted through said registering openings whereby movement of said actuating member in the other direction also acts through said arm members for shifting said crank axle in the other direction, a power device having a given extent of operation connected between said frame means and said swingable arm member and adapted when actuated to shift said crank axle from one position to another, an arm on said crank axle having an opening therein, and a plate carried by said frame means and having an opening therein adapted to register with the opening in said last mentioned arm when said power device has been actuated through its full extent, said pin being insertable through the opening in said arm and plate for locking said crank axle in the position to which it is moved by the full extension of said power device, the latter being retractable, when said pin has been removed from said spaced arm members and said swingable arm, so as to swing said swingable arm away from said stop without affecting the position of said crank axle.

2. In an agricultural implement, frame means, a part shiftably mounted thereon, two spaced arm means connected to move with said part, a third arm swingable relative to one of said spaced apart arm means and disposed closer to said one arm means than the other, stop means acting between said one arm means and said third arm, a double-acting hydraulic cylinder unit detachably connected between said third arm and said frame means so that extension of said hydraulic cylinder unit will act through said stop means and said one arm means to shift said part in one direction, means for detachably locking said third arm to said one arm means so that retraction of said cylinder unit will shift said part in the other direction, and means engageable with said frame and with the other of said spaced arm means only for releasably locking said other of said spaced apart arm means to said frame means when said cylinder unit is fully extended so as to accommodate the release of said detachable locking means and thereby provide for the unhampered removal of said cylinder unit.

3. In an agricultural implement having frame means and a crank axle swingably connected therewith, a pair of arm members fixed to said crank axle and having a stop member connecting said arm members, an actuating arm pivotally conected with said crank axle and disposed between said arm members and adapted, when swung in one direction, to engage said stop member whereby continued movement in that direction of said actuating arm serves to swing said arm members and said crank axle, said arm members and said actuating arm having openings that are adapted to register with one another when said actuating arm is in engagement with said stop member, a pin adapted to be inserted through said registering openings whereby movement of said actuating arm in the other direction also acts through said arm members for shifting said crank axle in the other direction, and a double-acting power device having a given extent of operation connected between said frame means and said swingable actuating arm and adapted when actuated to shift said crank axle from one position to another.

4. For use in an agricultural implement having frame means and a crank axle swingably connected therewith, the improvement which comprises arm means fixed to said crank axle and having a stop member, an actuating arm pivotally connected with said crank axle and disposed alongside said arm means and adapted, when swung in one direction, to engage said stop member whereby continued movement in that direction of said actuating arm serves to swing said arm means and said crank axle, said arm means and said actuating arm having openings that are adapted to register with one another when said actuating arm is in engagement with said stop member, a pin adapted to be inserted through said registering openings whereby movement of said actuating member in the other direction also acts through said arm means for shifting said crank axle in the other direction, a power device having a given extent of operation connected between said frame means and said swingable arm member and adapted when actuated to shift said crank axle from one position to another, an arm on said crank axle having an opening therein, and an apertured part on said frame means and having an opening therein adapted to register with the opening in said last mentioned arm when said power device has been actuated through its full extent, said pin being insertable through the opening in said arm and apertured part for locking said crank axle in the position to which it is moved by the full extension of said power device, the latter being retractable, when said pin has been removed from said spaced arm means and said swingable arm, so as to swing said swingable arm away from said stop without affecting the position of said crank axle.

5. For use in an agricultural implement having frame means and a part shiftably mounted thereon, and a double-acting hydraulic cylinder unit adapted to be detachably connected at one end with said frame means: the improvement which comprises two spaced apart sections adapted to be connected to said implement part so as to move therewith relative to said frame means, one of said sections comprising a pair of relatively closely spaced arm members having, spaced from said part, a pair of aligned openings, an arm mounted for pivotal movement relative to and disposed between said arm members and adapted to receive the other end of said cylinder unit, stop means acting between said pivoted arm and said arm members whereby operation of said cylinder unit in one direction will act through said arm, said arm members and said stop means to shift said implement part in one direction, said arm having an aperture adapted to register with said aligned openings in said arm members, means disposable in said registering openings for detachably locking said arm and arm members so that operation of said cylinder unit in either direction will act through said locking means, said arm and said arm members to shift said implement part in either direction, and means for releasably locking said other section to said frame when said cylinder unit has completed its movement in one direction so as to accommodate the release of said detachable locking means from said arm and arm members and thereby provide for the unhampered removal of said cylinder unit.

6. In an agricultural implement having frame means, a part shiftably mounted thereon, and a double-acting power device having a given extent of operation adapted to be mounted on the implement and connected between said frame means and said shiftable implement part, a pair of arm members adapted to be fixed to said part and having a stop member connecting said arm members, an actuating arm pivotally connected with and disposed between said arm members and adapted, when swung in one direction, to engage said stop member whereby continued movement in that direction of said actuating arm serves to swing said arm members and said shiftably mounted implement part, said arm members and said actuating arm having openings that are adapted to register with one another when said actuating arm is in engagement with said stop member, a pin adapted to be inserted through said registering openings so that movement of said actuating arm in the other direction acts through said arm members for shifting said implement part in the other direction, a third arm member fixed to said part in axially spaced relation with respect to said pair of arm members and mounted to move adjacent a portion of said frame, and means for locking said arm member to said frame portion when said power device has been operated through said given extent for locking said shiftably mounted part to said implement frame.

7. In an agricultural implement having frame means, a part shiftably mounted thereon, and a double-acting power device having a given extent of operation and adapted to be detachably connected at one end with said frame means: the improvement comprising a pair of arm members adapted to be fixed to said part and having a stop member connecting said arm members, an actuating arm pivotally connected with and disposed between said arm members and adapted, when swung in one direction, to engage said stop member whereby continued movement in that direction of said actuating arm serves to swing said arm members and said shiftably mounted implement part, said arm members and said actuating arm having openings that are adapted to register with one another when said actuating arm is in engagement with said stop member, a pin adapted to be inserted through said registering openings so that movement of said actuating arm in the other direction acts through said arm members for shifting said implement part in the other direction, means on said actuating arm to detachably receive the other end of said double-acting power device, a third arm member connected to move with said part and spaced from said pair of arm members into a position adjacent a portion of said implement frame when said power device has been operated through said given extent, and said third arm member and said frame portion being apertured to receive said pin, whereby said shiftably mounted part is locked to said frame means.

8. A ram mounting for an implement of the type that is adapted to be connected with a tractor having a double-acting hydraulic ram for operating a part on the implement, said ram having a given extent of movement and said implement having supporting frame means, said ram mounting comprising a pair of members interconnected to swing together in at least one direction relative to and mounted on said implement frame means, means for connecting said members with said implement part for operating the latter, a bracket on said implement spaced from said members, means disposable between said members for detachably connecting one end of said ram to said members, means for detachably connecting the other end of said ram to said bracket, said ram reacting against said bracket and said members to shift said members and said implement part in said one direction relative to said frame means, a third member spaced from said pair of members and connected to move with said implement part into a given position relative to said frame means by the operation of said ram through said full extent of movement, an apertured portion on said third member, and abutment means on said implement frame means, said abutment means being arranged relative to said third member so that when said third member reaches said given position the aperture in said third member moves into adjacency relative to said abutment means, and a locking part insertable into said aperture and adapted to engage said abutment means for holding said third member and said implement part against movement when the ram is retracted, thereby providing for substantially unhampered removal of said ram from the implement.

WALTER H. SILVER.
JOHN I. CANTRAL.

REFERENCES CITED

The following references are of record in the file of this patent:

UNITED STATES PATENTS

| Number | Name | Date |
|---|---|---|
| 1,969,684 | Bird | Aug. 7, 1934 |
| 2,324,840 | Hipple | July 20, 1943 |
| 2,344,123 | Brown et al. | Mar. 14, 1944 |
| 2,362,578 | Mott | Nov. 14, 1944 |
| 2,369,437 | Court | Feb. 14, 1945 |
| 2,532,577 | Silver et al. | Dec. 5, 1950 |